Patented Dec. 18, 1945

2,391,227

UNITED STATES PATENT OFFICE 2,391,227

SOLVENT EXTRACTION OF SYNTHETIC LATICES

Albert M. Clifford, Stow, Ohio, and Charles F. Winans, Edgewood, Pa., assignors to Wingfoot Corporation, Akron, Ohio, a corporation of Delaware No Drawing. Application May 12, 1942, Serial No. 442,622

3 Claims. (Cl. 260—84)

This invention relates to the solvent extraction of synthetic latices and, more particularly, to the recovery of unreacted acrylic nitriles from emulsion copolymerization reactions in which more of such acrylic nitrile is present than copolymerizes with the other monomer or monomers present. It is not unusual to have excess acrylic nitrile present when copolymerization is effected with vinyl chloride, vinylidene chloride, styrene or a butadiene monomer such as 1,3-butadiene, isoprene, 2,3-dimethyl butadiene, 2-chloro-butadiene or the like. Stopping the reaction before all of the acrylic nitrile has entered into the copolymerization may in some cases give properties of the synthetic rubber produced, which may be desirable.

According to this invention, the acrylic nitrile remaining after such partial copolymerization is recovered from the resultant latex by solvent extraction. Dibutyl ether and diamyl ether have been found to be the most satisfactory solvents to use for the extraction.

According to this invention, the latex containing the unreacted acrylic nitrile is treated one or more times with the extractant and the extract is separated from the latex by centrifuging. The latex is the partially prepared uncoagulated product of emulsion type copolymerization. Some of the solvent is present in the water serum and a part is present in the latex particles. The solvent used extracts acrylic nitrile from both the solid and liquid phase.

The solvent used must have a high solvent power for the acrylic nitrile. It must be immiscible with water in order that separation may be effected by centrifuging. The greater the density difference between the solvent and the water the more efficient is the subsequent centrifugal separation of the phases. Furthermore, the greater the difference between the boiling point of the solvent and the particular acrylic nitrile the more efficiently the solvent and the acrylic nitrile may be separated. The solvent must of course be chemically inert to the materials with which it is brought in contact. It must have not more than a small or low tendency to form stable emulsions. It must be readily available and cheap. The aromatic hydrocarbons such as toluene, xylene, tetralin, etc. are quite easily emulsified and some do not have a great density difference from water. They are, therefore, not altogether suited for use in this process. In the case of the high boiling petroleum distillates the distribution coefficients of the acrylic nitriles between the petroleum and the aqueous phase are not sufficiently high to permit satisfactory extraction. The heavy solvents, such as nitrobenzene, dichlorbenzene, brombenzene, dichlorethylether and acetylene tetrachloride, etc. are somewhat expensive but are excellent solvents and suited for use in this process. The preferred solvents, however, are ethers of eight to ten carbon atoms, such as dibutyl ether and diamyl ether, butylamyl ether, propylhexyl ether, etc.

The copolymer may be formed, for example, by mixing the following materials:

| | Parts by weight |
|---|---|
| Butadiene | 4 |
| Acrylic nitrile | 4 |
| Emulsifier | 10 |
| Sodium perborate | 0.06 |
| Carbon tetrachloride | 0.23 |
| Acetaldehyde in 0.22 parts by wt. of water | 0.0201 |
| Potassium cyanide in 0.22 parts by wt. of water | 0.0092 |

The emulsifier may, for example, comprise the following:

| | Parts by weight |
|---|---|
| Aquarex D (sodium lauryl sulfate) | 0.2492 |
| Citric acid | 0.0432 |
| Disodium phosphate | 0.0776 |
| Water | 9.63 |

Instead of acrylic nitrile, any other of the acrylic nitriles may be used in the above formula, such as ethacrylonitrile, methacrylonitrile, etc.

Such a mixture may be placed in a glass lined autoclave and run until the reaction is for example about 50% complete. This may require about 2-3 hours at a temperature of about 32° C. At the end of this time, the latex is preferably stabilized as for example by adding an emulsion of benzene and phenyl beta naphthyl-amine in water or by adding an emulsion of the condensation product of cresol and aniline. When the autoclave is opened, the unchanged or residual butadiene will escape as a gas and can be readily recovered in comparative purity by known means, but the unchanged acrylic nitrile remains in the latex, a part being dissolved or emulsified in the water serum and a part being dissolved or adsorbed by the particles of the copolymer.

The solvent extraction may be carried out in various ways. It is preferably a multiple extraction or an extraction effected on a counter-current basis. The extraction may be effected by shaking the solvent with the latex or by spraying a stream of fine particles of the latex down through lighter extraction media or up through heavier extraction media. Any of the various known means of bringing a solvent into contact with a dispersion may be used.

After the extraction the solvent is separated from the latex by centrifuging. The centrifuging should be done at high speeds, for example, at a speed sufficient to give the effect of about 5,000 times that of gravity or greater. Unless some vapor-tight equipment is employed, there may be a considerable loss of solvent due to evaporation as the liquid is thrown out from the discharge orifices of the rotor. The latex must be added to the centrifuge with care to keep coagulation losses to a minimum.

In carrying out the extraction the latex may be treated with half its volume of solvent or any other feasible proportion of solvent may be employed. The solvent may become emulsified due to the presence of the emulsifying agent in the serum, in which case it will not separate out from the latex on standing. Therefore, before separating, a centrifuge is used to separate the solvent. The solvent will eventually be separated from the dissolved acrylic nitrile by any usual means, preferably by distillation.

We claim:

1. The method of extracting an unreacted acrylic nitrile from an emulsifier-containing synthetic latex produced by a co-polymerization process which utilizes only a part of the acrylic nitrile present in the polymerization formula which comprises extracting the latex with an alkyl ether of 8 to 10 carbon atoms, thereby dissolving acrylic nitrile in the ether, and then separating from the latex the ether and the acrylic nitrile dissolved therein by subjecting the mixture containing the latex to separation in a centrifuge giving the effect of at least 5000 times that of gravity.

2. The method of extracting an unreacted acrylic nitrile from an emulsifier-containing synthetic latex produced by a co-polymerization process which utilizes only a part of the acrylic nitrile present in the copolymerization formula which comprises extracting the latex with dibutyl ether, thereby dissolving acrylic nitrile in the ether, and then separating from the latex the ether and the acrylic nitrile dissolved therein by subjecting the mixture containing the latex to separation in a centrifuge giving the effect of at least 5000 times that of gravity.

3. The method of extracting an unreacted acrylic nitrile from an emulsifier-containing synthetic latex produced by a copolymerization process which utilizes only a part of the acrylic nitrile present in the polymerization formula which comprises extracting the latex with diamyl ether, thereby dissolving acrylic nitrile in the ether, and then separating from the latex the ether and the acrylic nitrile dissolved therein by subjecting the mixture containing the latex to separation in a centrifuge giving the effect of at least 5000 times that of gravity.

ALBERT M. CLIFFORD.
CHARLES F. WINANS.